106-88    AU 115    EX
3/7/78    OR    4,077,809

United States Patent [19]

Plunguian et al.

[11] 4,077,809
[45] Mar. 7, 1978

[54] CELLULAR CEMENTITIOUS COMPOSITIONS AND METHOD OF PRODUCING SAME

[76] Inventors: Mark Plunguian, 6912 Columbia Dr.; Charles E. Cornwell, 4104 Marlan Dr., both of Alexandria, Va. 22307

[21] Appl. No.: 725,787

[22] Filed: Sep. 23, 1976

Related U.S. Application Data

[63] Continuation-in-part of Ser. No. 501,573, Aug. 20, 1974, abandoned, and Ser. No. 585,496, Jun. 10, 1975, abandoned.

[51] Int. Cl.² .............................................. C04B 21/00
[52] U.S. Cl. ........................................ 106/88; 106/90; 106/104; 106/109; 260/29.65
[58] Field of Search ................................... 106/86–88, 106/90, 104; 260/29.65

[56] References Cited

U.S. PATENT DOCUMENTS

| 2,921,862 | 1/1960 | Sucetti | 106/88 |
| 3,775,351 | 11/1973 | Sachs | 106/90 |
| 3,989,534 | 11/1976 | Plunguian et al. | 106/88 |

*Primary Examiner*—J. Poer

[57] ABSTRACT

A cellular product useful for such purposes as fireproofing, thermal insulation, and acoustical soundproofing, may be produced from a mineral cement, such as portland cement, calcium aluminate cement, and gypsum cement, a water soluble organic film-former, an emulsion of a synthetic resin with a glass transition temperature of 10°–25° C, a mixture of anionic and nonionic surfactants, an aggregate, and air in an amount substantially in excess of that used in air entrainment of cements, admixed in the form of a stabilized foam, whereby the product has a density which is substantially lower than the density of the mineral cement and aggregate per se.

7 Claims, No Drawings

CELLULAR CEMENTITIOUS COMPOSITIONS AND METHOD OF PRODUCING SAME

CROSS REFERENCE TO RELATED APPLICATIONS

This application is a continuation-in-part of copending applications Ser. No. 501,573, filed Aug. 20, 1974, now abandoned, and Ser. No. 585,496, filed June 10, 1975 now abandoned.

BACKGROUND OF THE INVENTION

A primary object of the invention is to provide a stable, lightweight cellular cementitious composition useful for a wide variety of purposes, including fireproofing of steel and concrete, thermal insulation for domestic and industrial structures, and acoustical soundproofing of structural parts, production of highway noise reduction barriers, and for industrial noise reduction.

Another object of the present invention is to provide a novel method for the production of stable, cellular cementitious compositions which contain large amounts of air cells.

SUMMARY OF THE INVENTION

Our application Ser. No. 501,673 describes a process for forming lightweight cellular compositions from a mineral cement, a lightweight mineral aggregate, a film-former and viscosifier foam stabilizer, a synthetic foaming surfactant which is preferably a combination of anionic and nonionic foaming surfactants, water which is used in processing and part of which is required to combine with the hydraulic cement to render it settable, and air incorporated into the cementitious slurry as stabilized foam.

The application Ser. No. 585,496 describes further improvements in the stability of the aqueous foamed compositions by incorporating into the aqueous foaming composition certain synthetic resin emulsions which are film-formers at room temperature. The synthetic resin and plasticizer components of these emulsions have a glass transition temperature of about 10°–25° C. They comprise mostly vinyl acetate and acrylate homopolymers, copolymers, and terpolymers and styrene-butadiene resins.

Further improvements have now been made in the above procedures and the resulting products. These features and the advantages of the invention will become apparent from the following detailed descriptions. The foamed cementitious compositions of the invention may be formed into final products by known techniques such as pumping, spraying, casting, or trowelling to provide settable lightweight cellular compositions whose densities are appreciably less than the density of a conventional mix of a mineral cement and aggregate. The portland and calcium aluminate cement compositions can be produced in a range of 20–90 pounds per cubic foot air-dry densities, while the gypsum cement compositions can be produced in a range of about 12–30 pcf.

DETAILED DESCRIPTIONS OF THE INVENTION

The stable, lightweight cellular compositions of the invention are produced from a mineral cement and an aggregate. The aggregate may be of the lightweight variety, such as perlite, vermiculite, expanded shale and clay, or higher density sand for greater compressive strength. An appreciable reduction in the density of these products can be achieved by incorporating air cells into these cementitious slurries, substantially in excess of the amount of air introduced in air-entrained concrete. These air cells, in the form of stabilized foam, may be introduced by aeration of the slurry composition, or preferably by intermixing the slurry with a prefoamed aqueous foam composition.

In order to incorporate substantial amounts of air into the cementitious compositions use is made of film-formers and viscofiers to increase the stability of the foam. The presently preferred stabilizers are a combination of a cold water-soluble organic compound such as guar gum, xanthan gum, or protein colloids, and a synthetic resin emulsion which is film-forming at room temperature and is compatible with the mineral cement. The gums and viscosifier foam stabilizers may be dissolved in the aqueous foaming solution. It is sometimes preferable to dissolve the gum stabilizers in the cementitious slurry. When the preformed foam is then admixed to this formulated slurry, the whole wet composition is stabilized in the foamed, expanded state until the hydraulic cement is set. It can then be cured and dried to the lightweight useful product. This procedure lends itself particularly to preblending all the dry components for storage and shipment. This blend can be slurried in water and the preformed foam admixed to it, and made ready to be sprayed or cast into a substrate or into a form.

Examples of the emulsions, with about 50–55% total solids, which have been found to be good foam stabilizers are formed from the following resins:

Vinyl acetate homopolymer
Vinyl acetate-acrylic copolymer (Polyco 2151, Borden)
Vinyl chloride internally plasticized copolymer
Vinylchloride externally plasticized copolymer
Polyacrylic emulsion (Rhoplex AC35, Rhom & Haas)
Carboxylated styrene-butadiene copolymer
Vinyl chloride-vinylidene chloride copolymer
Vinyl chloride-vinylidene chloride-acrylic terpolymer The surfactant component, which may be one or more surfactants used in combination, is selected from those which have high foaming activity. This component forms the foaming agent, or the agent designed to foam and incorporate air cells into the cementitious composition. The foaming component is preferably a combination of anionic and nonionic surfactants. Suitable surfactants having the desired foaming characteristics are:

Poly (ethylene glycol) 9(ethylene oxy) ethanol (Tergitol 15S9)
Nonyl phenol poly(ethylene oxy)ethanol
Octyl phenoxy polyethoxy ethanol
Polyoxyethylene (12) tridecyl ether (Renex 30, ICI America)

Suitable anionic surfactants which may be used are:
Sodium sulfate alkyl phenoxy poly(ethylene oxy) ethanol
Ammonium salt of $C_{12}$–$C_{15}$ linear primary alcohol ethoxysulfate
Alkyl alchohol sulfate
Sodium salt of alkyl aryl polyether sulfonate
Dihexyl ester of sodium sulfosuccinic acid
Sodium decyl benzene sulfonate (Ultrawet 30DS, Arco, 30% solids)

The aggregate may be one of the heat expanded lightweight minerals or conventional sand. The reinforcing fiber glass, when used, may be either chopped fibers, or fiber glass fabric.

The presently preferred compositions of the invention contain the following components, exclusive of air, in the following ratios, expressed in parts by weight:

| Component | Parts by Weight |
|---|---|
| Mineral Cement | 100 |
| Water | 35–150 |
| Mineral Aggregate | 10–350 |
| Water-soluble Organic Film-former | 0.1–2.0 |
| Synthetic Resin Emulsion (50–55% solids) | 0.3–1.2 |
| Equivalent resin in the emulsion | 0.15–0.66 |
| Synthetic surfactants | 0.1–3.0 |
| Pozzolonic fly ash | 0–50 |
| Fiber Glass | 0–15 |

The presently preferred method of producing the cellular structure in the cementitious composition is to admix a preformed foam to the formulated cementitious slurry. The cementitious slurry is composed of the aqueous dispersion of cement, aggregate, fly ash, and foam stabilizer. The foaming solution is composed of a foam concentrate and water of dilution. The cementitious slurry is mixed either batchwise, such as in a mortar mixer, or continuously. A foam is generated in the foaming solution and this preformed foam is admixed to the cementitious slurry to produce the cellular structure. The foamed cementitious slurry may then be applied by pumping, spraying, casting, or trowelling to a substrate, and is allowed to set, cure, and dry to produce the lightweight composition of this invention.

A typical foaming concentrate comprises the following components in parts by weight:

| | |
|---|---|
| Sodium decyl benzene sulfonate (30%) | 3 parts |
| Poly (ethylene glycol)9(ethylene oxy) ethanol | 2 parts |
| Vinyl acetate-acrylic copolymer emulsion (55% solids) | 4 parts |
| Guar gum | 0.5 parts |
| Total | 16.5 |

At the point of use, one part of this concentrate by weight is diluted with eight to fifteen parts of water.

The 1:15 foaming solution thus contains about 0.35% sodium decyl benzene sulfonate, 0.78% poly (ethlene glycol)9(ethylene oxy) ethanol, 0.86% vinyl acetate-acrylic copolymer resin. The 1:8 dilution of the concentrate comprises 0.6% sodium decyl benzene sulfonate, 1.4% poly (ethylene glycol)9(ethylene oxy) ethanol, and 1.5% vinyl acetate-acrylic copolymer resin.

A foam is generated in this diluted solution and the preformed foam is admixed to the cementitious slurry to give a light weight cellular product upon setting.

Foam Stability Test

The following test procedure was devised as a preliminary approximate evaluation of the various foam stabilizers. 100 grams of diluted foam concentrate was diluted and foamed by means of an aerating impeller to give about one quart of foam by volume. The first sign of breakdown of the foam, as shown by separation of the liquid at the bottom of the glass vessel, was taken as the end point. The same material was then re-foamed, but this time with the addition of a well-dispersed slurry of 10 grams portland cement in 5 grams water. The stability of the foam in the presence of portland cement was again noted as before, thus showing the relative stability of the system in the presence of portland cement. The composition of stabilities of several stabilized foams are shown in Table I.

The data in Table I show that a 2% guar gum solution by itself, or a dilute vinyl acetate-acrylic copolymer emulsion by itself, are poor stabilizers for the foam. However, the addition of this emulsion to a guar gum solution (Example 3) greatly increased the foam stability. The other samples show the foam stabilities of xanthan gum solution with another emulsion.

Table I.

| | Examples of Foam Stabilization | | | | | |
|---|---|---|---|---|---|---|
| Example No. | 1 | 2 | 3 | 4 | 5 | 6 |
| Water (g.) | 49 | 49 | 49 | 49 | 49 | 49 |
| Guar gum (g.) | 1 | — | 1 | 1 | — | — |
| Xanthan gum (g.) | — | — | — | — | 1 | 1 |
| Ultrawet 30DS (g.) | 0.5 | 0.5 | 0.5 | 0.5 | 0.5 | 0.5 |
| Renex 30 (g.) | 0.5 | 0.5 | 0.5 | 0.5 | 0.5 | 0.5 |
| Polyco 2151, 55% (g.) | — | 4 | 2 | 4 | — | — |
| Rhoplex AC35, 50% (g.) | — | — | — | — | 4 | 4 |
| Total weight (g.) | 51 | 54 | 53 | 55 | 55 | 66 |
| Stability Test | | | | | | |
| Dilution ratio concentrate:water | 1:4 | 1:8 | 1:8 | 1:15 | 1:8 | 1:15 |
| Stability (min.) | 5 | 4 | 35 | 45 | 45 | 40 |
| After cement addn. Stability (min.) | — | — | 30 | 40 | 40 | 35 |

Table II.

| Examples 7–13. Formulation of portland cement and aggregates with and without stabilized foam in parts by weight | | | | | | | |
|---|---|---|---|---|---|---|---|
| Example No. | 7 | 8 | 9 | 10 | 11 | 12 | 13 |
| Water | 14.5 | 41.5 | 62.5 | 82 | 64.5 | 45 | 40 |
| Portland cement | 100 | 100 | 100 | 100 | 100 | 100 | 100 |
| Fly ash | — | 33 | — | 33 | — | 20 | 20 |
| Perlite | 24.6 | 27.7 | — | — | 20.8 | — | — |
| Vermiculite | — | — | 20.8 | 27.7 | — | — | — |
| Sand | — | — | — | — | — | 300 | 100 |
| Fiber Glass (¼") | 1 | 2 | 1.5 | 2 | 1.5 | — | — |
| Foam concentrate | 2.8 | 3.6 | 3.7 | 2.8 | — | 1.3 | 1.3 |
| Ultrawet 30DS | 0.5 | 0.65 | 0.68 | 0.5 | — | 0.24 | 0.24 |
| Tergitol 15S9 | 0.34 | .44 | 0.45 | 0.34 | — | 0.16 | 0.16 |
| Polyco 2151,55% | 0.68 | .88 | 0.90 | 0.68 | — | 0.32 | 0.32 |
| Equiv.solids | 0.37 | .49 | 0.5 | 0.37 | — | 0.17 | 0.17 |
| Guar Gum | 0.09 | .11 | 0.11 | 0.09 | — | 0.04 | 0.04 |
| Water | 1.55 | 1.97 | 2.05 | 1.55 | — | 0.72 | 0.72 |
| Dilution water | 41.7 | 54.4 | 55.3 | 41.7 | — | 18.7 | 18.7 |
| Wet density of boards (pcf) | 37 | 45 | 41 | 45 | 81 | 105 | 95 |
| Dry density (pcf) | 26 | 28.6 | 26 | 27.4 | 58 | 90 | 80 |

The examples in Table II show the formulation of portland cement and aggregates with and without the addition of stabilized foam. The preformed foams were generated from a concentrate diluted with 15 times its weight of water. The preformed foam was folded in, or mixed with the aqueous slurry of all the other components. Some of these foamed slurries were cast into wooden molds of ¾, 1, and 1¼ high by 12 square on ⅛ inch thick steel plates 10 inches square. After one day in the molds, the boards with the steel plates attached were removed from the molds and cured for seven days at room temperature. They were then tested for fire resistance in the following manner:

The boards were placed with the insulating cement downward over a five-inch diameter circular gas flame of 2700° F. Thermocouple leads were attached to the steel plate on top. The thermocouple meter was adjusted to zero° F for the ambient temperature, and the highest temperature on the steel plates was recorded periodically over a two hour period. The average results of these temperatures over the elpased period of flame treatment are reproduced in Table III.

Table III.

Results of Fireproof Tests on Boards - Examples 7-11

| Specimens | Average Dry Density (pcf) | Thickness Of Boards (inches) | Temperature on Steel Plates(° F) above ambient temperature, after elapsed time of exposure to flame | | | | |
|---|---|---|---|---|---|---|---|
| | | | 15 | 30 | 60 | 90 | 120 Minutes |
| Ex 11 | | ¾" | 170 | 230 | 350 | 430 | 440 |
| No foam | 58 | 1" | 125 | 210 | 310 | 360 | 390 |
| | | 1¼" | 90 | 200 | 280 | 310 | 340 |
| Averages | | ¾" | 95 | 170 | 265 | 300 | 330 |
| Exs. 7-10 | 27 | 1" | 65 | 120 | 220 | 250 | 280 |
| With foam | | 1¼" | 40 | 75 | 130 | 160 | 170 |

Directly after completing the test, the hot specimens were sprayed with a forceful stream of water on the side which had been exposed to the gas flame. All specimens without foam cracked and separated from the steel plate. The cold water test could not be run on these samples. The specimens with the foam showed no indication of heat damage, had very good bonding to the steel plate which endured the heat treatment, and showed no deleterious effects from the cold water spray.

ASTM E-119 test for fireproof steel columns gives an allowable temperature rise on the steel of 1000° F. Normal concrete of about 140 pounds per cubic foot (pcf) density disintegrates at about 620°-800° F.

EXAMPLE 14

The following formulation was mixed in a mortar mixer: water, 68 pounds; 1:15 diluted foam solution, 8 pounds; portland cement, 94 pounds; fly ash, 28 pounds; vermiculite, 12 pounds; and guar gum 0.9 pounds. The mix was dumped into a hopper and pumped through fifty feet of 1 inch diameter hose to a spray nozzle. Just before reaching the nozzle, preformed foam was introduced into the stream of the cementitious slurry and mixed with it through a short section of a static mixer, to give a uniform lightweight slurry. The amount of preformed foam was adjusted to give a sprayed wet density of about 33-34 pcf. The material was sprayed into molds of 4 × 4 feet and screeded off to give one inch thick boards. Additional mixes were prepared and sprayed to fill eight 4 × 4 foot molds, or a total of 128 square feet of board one inch thick. The boards were cured at room temperature for 2 weeks.

These boards were tested by the Cedar Knolls Acoustical Laboratories for sound absorption properties with the following results:

| Frequency (Hertz) | 125 | 250 | 500 | 1000 | 2000 | 4000 |
|---|---|---|---|---|---|---|
| Absorption, sabins | 26.9 | 25.4 | 46.9 | 97.1 | 123 | 87.6 |
| Coefficient, sabin per square foot | 0.21 | 0.20 | 0.37 | 0.76 | 0.96 | 0.68 |

Noise reduction coefficient, NRC: 0.55

EXAMPLE 15

The formulation and spraying procedure of Example 14 was repeated, with reinforcement of the panels with 6 × 6 fiber glass fabric. After spraying about ¼ inch of foamed material, a 4 × 4 foot fiber glass open weave fabric (scrim) was placed in the mold. Another ½ inch of material was sprayed into the mold and another layer of fiber glass scrim was placed in the mold. The spraying was completed, screeded to one inch thickness, and cured at room temperature. This panel showed the same interconnected cellular structure as for Example 14, indicative of good sound absorption properties, with improved strength characteristics.

It should be appreciated that those skilled in the art could suggest various changes and modifications of the presently preferred embodiments of the invention after being apprised of same. It is intended to encompass all such changes and modifications as fall within the scope and spirit of the appended claims.

We claim:

1. A cellular cementitious composition comprising about 100 parts by weight of a mineral cement selected from the group consisting of portland cement, calcium aluminate cement, and gypsum cement, about 10-350 parts by weight of a mineral aggregate, about 0.1-2.0 parts by weight of a water-soluble organic film-former selected from the group (comprising) consisting of guar gum, xanthan gum, and protein colloids, about 0-50 parts by weight of pozzolonic fly ash, about 0-15 parts by weight of chopped fiber glass and fiber glass fabric, about 0.1-3.0 parts by weight of foam-producing synthetic surface active agents selected from the group (comprising) consisting of anionic and nonionic surface active agents and mixtures thereof, about 0.3-1.2 parts by weight of an emulsion of a synthetic resin having a glass transition temperature of 10-25° C, said emulsion having equivalent 0.15-0.66 parts by weight of synthetic resin solids, about 35-150 parts by weight of water, and at least 8 percent by volume of air incorporated into the composition, exclusive of any air in the aggregate.

2. A composition according to claim 1 wherein said mineral cement is portland cement or calcium aluminate cement and the dry composition has a density of 20–90 pounds per cubic foot.

3. A composition according to claim 1 wherein said mineral cement is gypsum cement and the dry composition has a density of about 12–30 pounds per cubic foot.

4. A composition according to claim 1 wherein the said synthetic resin emulsion is selected from the group of resins consisting of vinyl acetate homopolymer, vinyl acetate copolymer, vinyl acetate-acrylic copolymer, vinyl chloride internally plasticized copolymer, externally plasticized vinyl chloride copolymer, carboxylated styrene-butadiene copolymer, polyacrylic resin, vinyl chloride-vinylidene chloride copolymer, and vinyl chloride-vinylidene chloride-acrylic terpolymer, and mixtures thereof.

5. A process for producing a foamed cementitious composition comprising the steps of mixing together an aqueous dispersion about 100 parts by weight of a mineral cement, selected from the group (comprising) consisting of portland cement, calcium aluminate cement, and gypsum cement, about 10–350 parts by weight of mineral aggregate, about 0.1–2.0 parts by weight of a water-soluble organic film-former selected from the group consisting of guar gum, xanthan gum, protein colloids, about 0–50 parts by weight of pozzolonic fly ash, about 0–15 parts by weight of chopped fiber glass, about 0.1–3.0 parts by weight of synthetic foam producing anionic and nonionic surface active agents and mixtures thereof, about 0.3–1.2 parts by weight of an emulsion of a synthetic resin having a glass transition temperature of 10–25° C, said emulsion having equivalent 0.15–0.66 parts by weight of synthetic resin solids, and about 35–150 parts by weight of water, stirring the resulting aqueous mixture and incorporating air thereto, in an amount of at least 8 percent by volume based on the final set foamed composition, exclusive of any air in the aggregate, curing, and drying the foamed cementitious composition.

6. A process for producing a foamed cementitious composition comprising the steps of mixing together about 100 parts of a mineral cement, about 10–350 parts by weight of a mineral aggregate, about 0.1–2.0 parts by weight of a water-soluble organic film-former selected from the group consisting of guar gum, xanthan gum, and protein colloids, about 0–50 parts by weight of pozzolonic fly ash, about 0–15 parts by weight of chopped fiber glass, and 35–150 parts by weight of water, and mixing this slurry with a prefoamed composition formed by the aeration of 0.1–3.0 parts by weight of foam-producing anionic and nonionic surface active agents and mixtures thereof, 0.3–1.2 parts by weight of an emulsion of a synthetic resin having a glass transition temperature of 10°–25° C, said emulsion having equivalent 0.15–0.66 parts by weight of synthetic resin solids, curing, and drying the resulting foamed cementitious composition.

7. A process according to claim 6 wherein the resin emulsion is selected from the group of resins consisting of vinyl acetate homopolymer, vinyl acetate copolymer, vinyl acetate-acrylic copolymer, vinyl chloride internally plasticized copolymer, externally plasticized vinyl chloride copolymer, carboxylated styrene-butadiene copolymer, polyacrylic resin, vinyl chloride-vinylidene chloride copolymer, and vinyl chloride-vinylidene chloride-acrylic terpolymer, and mixtures thereof.

* * * * *